UNITED STATES PATENT OFFICE.

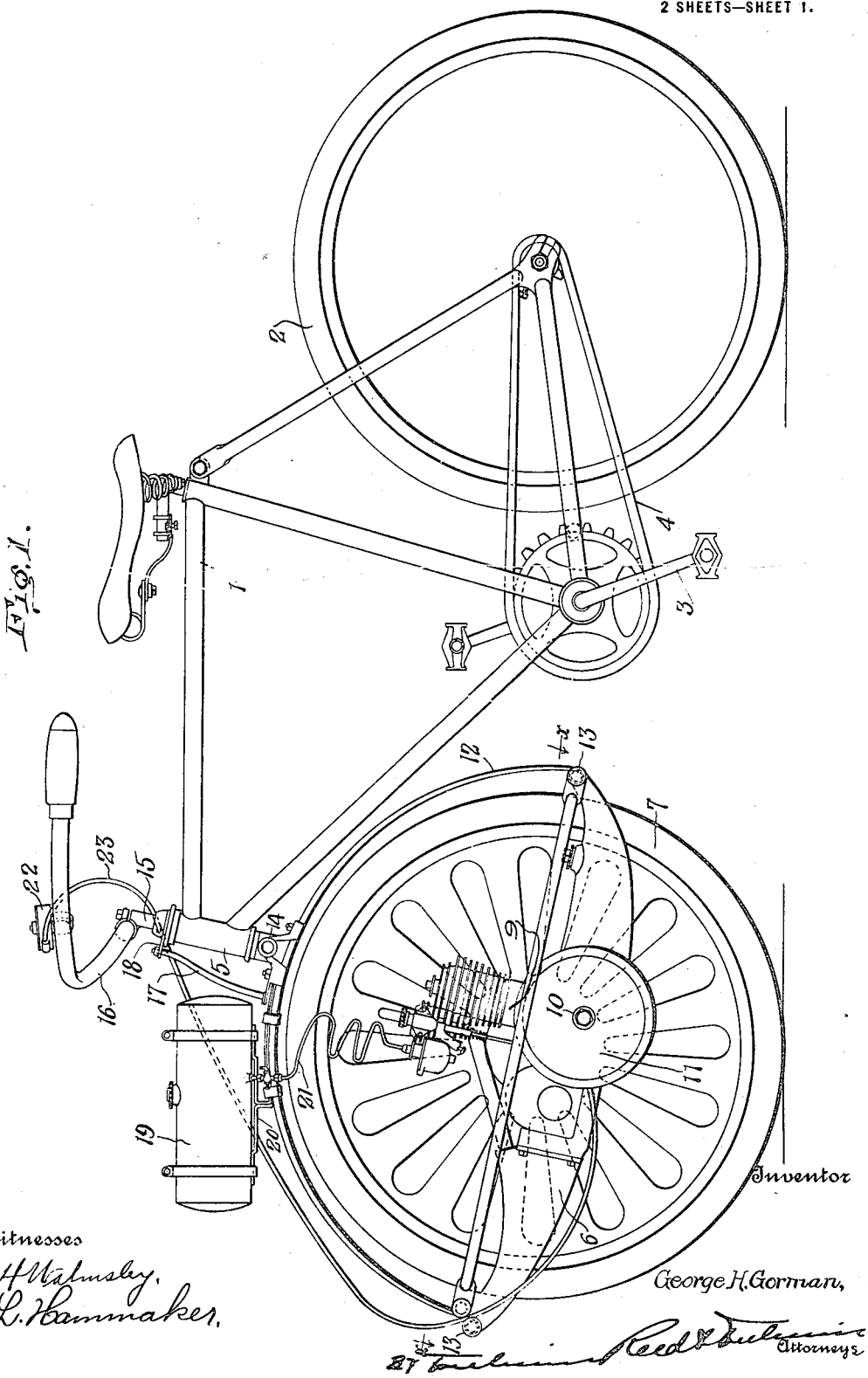

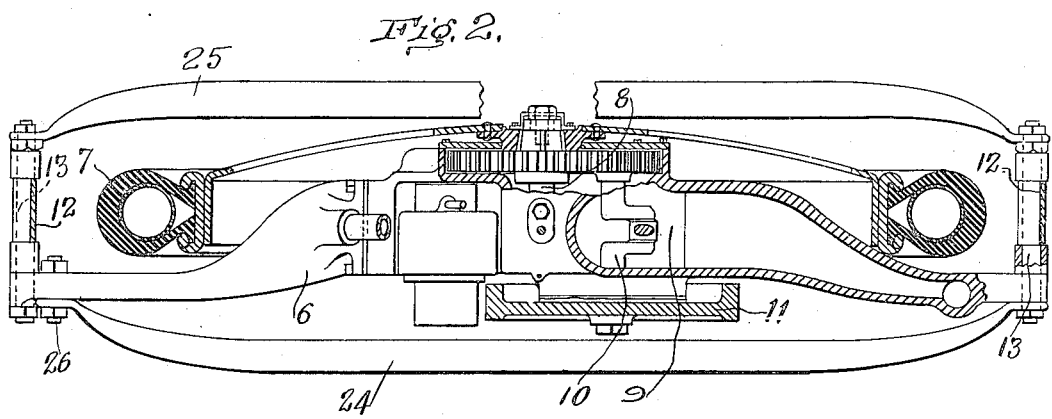
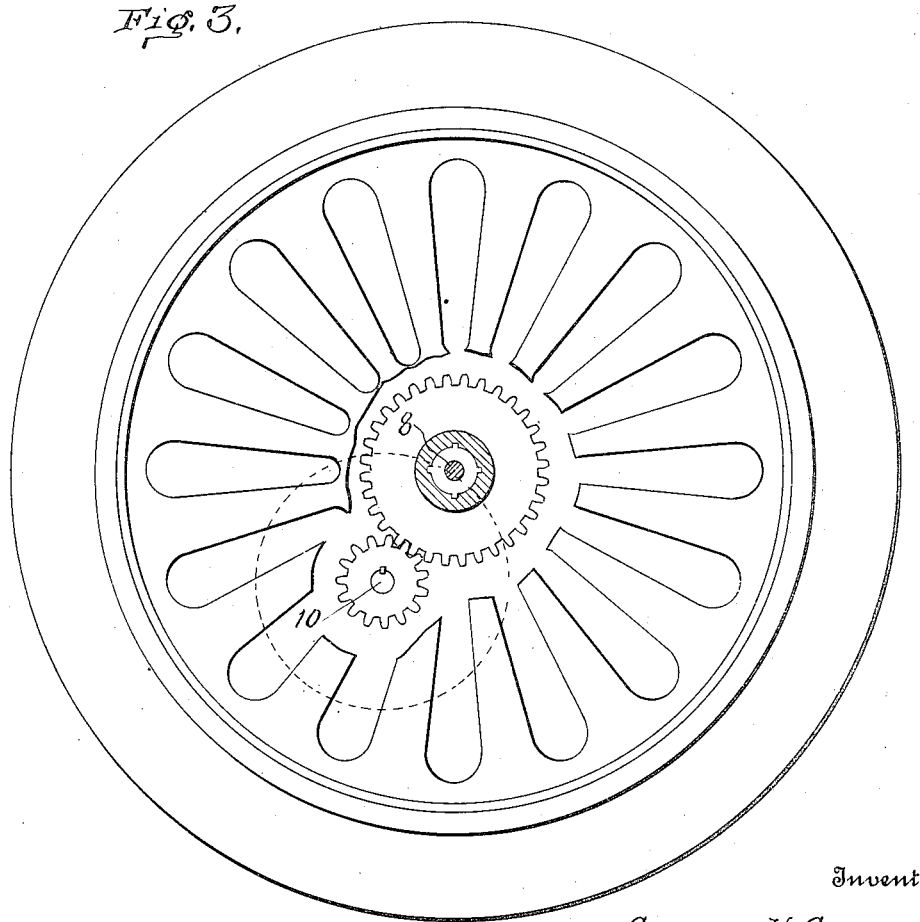

GEORGE HARRIES GORMAN, OF DAYTON, OHIO, ASSIGNOR TO THE DAVIS SEWING MACHINE COMPANY, OF DAYTON, OHIO, A CORPORATION OF OHIO.

PROPELLING DEVICE FOR VEHICLES.

1,168,300.  Specification of Letters Patent.  Patented Jan. 18, 1916.

Application filed March 17, 1915. Serial No. 15,063.

*To all whom it may concern:*

Be it known that I, GEORGE HARRIES GORMAN, a citizen of the United States, residing at Dayton, in the county of Montgomery and State of Ohio, have invented certain new and useful Improvements in Propelling Devices for Vehicles, of which the following is a specification, reference being had therein to the accompanying drawing.

This invention relates to propelling devices for vehicles and is designed more particularly for use with bicycles and vehicles of this class, although its use is not limited to two wheel vehicles.

The object of the invention is to provide a propelling device which can be applied to any ordinary bicycle or other vehicle without change in the main features of construction of that vehicle; and which will be of such a character that it can be applied to a vehicle and the completed vehicle sold at a low cost, or it can be sold separately from a vehicle and applied to vehicles already in use by substituting the same for parts of the vehicle.

To this end it is a further object of the invention to provide such a propelling device which will be self contained, that is, in which the propelling wheel, its motor and the coöperating mechanism will be built into a single unit which can be substituted for the corresponding parts of the vehicle without making any other change in the vehicle.

A further object of the invention is to provide such a mechanism which will be so constructed and so arranged that it will tend to maintain the equilibrium of the vehicle, which is especially desirable when the invention is applied to bicycles.

In the accompanying drawings, Figure 1 is a side elevation of a propelling device embodying my invention showing the same applied to a bicycle; Fig. 2 is a sectional view taken on the line *x x* of Fig. 1 and looking in the direction of the arrows; and Fig. 3 is an elevation of that side of the propelling wheel opposite the motor, partially broken away, to show the driving connection between the wheel and the motor.

In these drawings I have illustrated one embodiment of my invention and have shown the same as applied to a bicycle which comprises the usual main frame 1 having mounted in its rear end a driving wheel 2 which is driven by means of pedals 3 connected with the driving wheel by the usual sprocket chain 4. The sprocket chain is connected with the wheel through a coaster-brake hub of the usual type which permits of the forward movement of the bicycle while the pedals remain stationary and enables the brakes to be applied by the rearward movement of the pedals. These features being of well known construction it is not necessary to here illustrate them. The main frame is provided at its forward end with a steering head or vertical bearing 5 adapted to receive a spindle carried by the usual fork in which is mounted a steering wheel. In the present instance I have removed the steering fork and have substituted for the steering fork and its steering wheel my propelling device, the wheel of which, when so applied, becomes the steering wheel of the vehicle. It will be understood, however, that the device is not necessarily applied to the steering wheel of a vehicle, but this arrangement has certain advantages and I have, therefore, utilized it in the present instance.

As here shown the propelling device comprises a frame member 6 on which is supported a wheel 7. This wheel is preferably rigidly secured to an axle 8 which is journaled on the frame member. Mounted on the frame member in close proximity to the wheel, and preferably entirely within the circumference of the same, is a motor 9 which, in the present instance, is an ordinary single cylinder internal combustion engine but any type of engine or motor may be used. The crank shaft 10 for the motor is journaled in the auxiliary frame member 6 and the fly wheel 11 is arranged on that side of the frame member opposite the ground wheel 7. Preferably, the ground wheel 7 is dished or concave on the side adjacent to the auxiliary frame member 6 and the engine is mounted on the frame member in such a manner as to lie between the same and the wheel. This causes the motor to lie in the vertical plane of the adjacent side of the rim of the wheel. Further, the frame is so arranged and the motor is so mounted thereon that the greater portion of the weight is below the axis of the ground wheel, thus giving a low center of gravity, which, combined with the position of the engine with relation to the ground wheel, assists in the maintaining of the equilibrium of the vehicle. The ground wheel 7 is preferably arranged in alinement with the steering head of the main frame of the vehicle, and, consequently, the auxiliary frame member 6 lies at one side of the vertical plane of the steering head. The ends of the frame member are connected with the main frame by means of a connecting device which is secured to the opposite end portions of said auxiliary frame member. Preferably, these connecting devices are of a resilient character so that the auxiliary frame member and the parts carried thereby are yieldably connected with the main frame. As here shown, these connecting devices comprise a curved leaf spring 12 which is substantially semicircular in shape and is provided at its ends with bearings in which are mounted transverse pins 13, said pins having those ends adjacent to the frame member secured thereto.

Rigidly secured to the leaf spring 12 at a point between its ends and preferably near the center thereof is a bracket 14 having secured thereto a spindle 15 similar to the spindle of the steering fork, which has been removed, and adapted to be substituted for said spindle in the bearing 5 of the main frame, and to have secured to the upper end thereof the usual handle bars 16, whereby the wheel 7 may be manipulated for steering purposes. The only reinforcement I have found it desirable to make in connection with this frame is the use of one or more brace rods 17 between the bracket 14 and the upper portion of the spindle 15. As here shown the rod, or rods, is connected at its lower end to a forwardly projecting part of the bracket 14 and at its upper end to a plate or bracket 18 secured to the spindle just above the bearing 5. It will be apparent, therefore, that the auxiliary frame member 6 carries the steering wheel and the motor shaft in fixed relation one to the other and is so connected with the main frame as to yieldably support these parts and so as to permit them to be manipulated to steer the vehicle. Further, that the arrangement of the parts relatively to the main frame and relatively to each other is such as to greatly facilitate the maintenance of the equilibrium of the vehicle.

The fuel tank is preferably carried by the supplemental structure and it is here shown at 19 as mounted on a bracket 20 which is rigidly secured to the spring 12 just in front of the bracket 14. The connection between the tank and the carbureter of the engine may be made by means of a lead or copper tube 21 which has sufficient flexibility to permit of all the relative movement of the parts that will result from the resiliency of the spring 12. The engine may be controlled in any suitable manner but, in the present instance, I have mounted on the handle bars a controlling device 22 which is connected with the engine by means of a flexible member 23 and which may be manipulated to control the throttle valve of the engine and also to relieve the compression in the engine, whereby the latter may be turned over and started by running the wheel 7 along the ground. This device, however, is of a known construction and as it forms no part of the present invention it need not be here shown or described in detail.

The exact construction of the frame member 6 and the arrangement of the motor and its coöperating parts thereon, in respects other than those above mentioned, are unimportant and need not be considered as parts of the present invention, as this structure may be of any suitable character. While I have found the horizontal frame 6 mounted in the manner shown and described especially serviceable it will be understood that the auxiliary frame and its resilient connection with the main frame may take various forms and doubtless will be changed as the propelling device is applied to different vehicles or in different positions on the same vehicle.

To protect the propeller wheel and the mechanism carried thereby I have provided the same on either side of the supplemental frame with guard members 24 and 25, in the form of bars extending across the wheel and curved outwardly so as to project beyond the outermost parts of the mechanism on the respective sides of the wheel. These guard members are connected at their opposite ends with the adjacent ends of the frame member 6. The guard member 25 is shown as connected at both ends to the pins 13 by means of which the spring 12 is connected with the frame member 6, while the guard member 24 is connected at one end to the pin 13 and at the other end it is connected with the frame member 6 by means of a separate pin or bolt 26. The guard members not only serve to protect the parts against injury in case the vehicle is laid on its side or accidentally upsets, but they also serve as brace rods. This is particularly true of the bar 25 which ties together the ends of the pin 13 opposite the ends which are mounted in the frame member 6.

The device herein described is exceedingly simple in its construction and can be manufactured at such a cost as to permit the complete vehicle embodying the device to be sold at a relatively low price; and is further of such a character that it can be manufactured and sold as an attachment or a unit which can be substituted for existing parts of vehicles already in use, thereby enabling such a vehicle to be converted into a power driven vehicle at a very small expense.

While I have shown and described one embodiment of the invention it will be understood that this has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a vehicle, a main frame, an auxiliary frame member mounted thereon, a wheel journaled on said auxiliary frame member, a motor mounted on said auxiliary frame member, the journal of said wheel being located above the center of gravity of the auxiliary frame and motor.

2. In a vehicle, a main frame, a frame supporting wheel mounted at one end of said frame, an auxiliary frame member yieldably mounted at the other end of said main frame, a second frame supporting wheel journaled on said auxiliary frame member, a motor mounted on said auxiliary frame member in close proximity to said wheel, and a driving connection between said motor and said wheel.

3. The combination, with a vehicle frame, of a frame supporting wheel arranged in alinement with said frame, an auxiliary frame member arranged alongside of said wheel and intermediately supporting the same, a motor mounted on said auxiliary frame member and supported between said auxiliary frame member and said wheel, a driving connection between said motor and said wheel, and means for connecting the end portions of said auxiliary frame member to said main frame.

4. The combination, with a vehicle frame, of a frame supporting wheel arranged in alinement with said frame, an auxiliary frame member arranged alongside of said wheel and supporting the same, said auxiliary frame member being pivotally connected with said main frame to enable steering movement to be imparted to said wheel, a motor mounted on said auxiliary frame member in close proximity to said wheel, and a driving connection between said motor and said wheel.

5. In a vehicle, the combination, with a main frame having an approximately vertical bearing at one end thereof, of a propelling device comprising a spindle adapted to be mounted in said bearing, an auxiliary frame member connected with and carried by said spindle, a wheel journaled on said frame member and laterally spaced therefrom, a motor mounted on said frame member, and a driving connection between said motor and said wheel.

6. In a vehicle, the combination, with a main frame having an approximately vertical bearing at one end thereof, of a propelling device comprising a spindle adapted to be mounted in said bearing, an auxiliary frame member, a wheel journaled on said frame member, a motor mounted on said frame member, a driving connection between said motor and said wheel, and a resilient connection between said frame member and said spindle.

7. In a vehicle, the combination, with a main frame, of a curved spring secured between its ends to said main frame, an auxiliary frame member supported by said curved spring, a wheel mounted on said auxiliary frame member, and a motor mounted on said auxiliary frame member and operatively connected with said wheel.

8. In a vehicle, the combination, with a frame having a steering head at its forward end, a curved leaf spring connected with said steering head, an auxiliary frame member extending between the end portions of said curved spring, a wheel journaled on said frame member, a motor mounted on said frame member, and a geared connection between said motor and said wheel.

9. In a vehicle, the combination, with a frame having a steering head at its forward end, a curved leaf spring connected with said steering head, an auxiliary frame member extending between the end portions of said curved spring, a wheel journaled on said frame member, a motor mounted on said frame member, a geared connection between said motor and said wheel, and a fuel tank mounted on said spring and connected with said motor.

10. In a bicycle, the combination, with a main frame having a substantially vertical bearing at its forward end, of a spindle mounted in said bearing, handle bars secured to the upper end of said spindle, a substantially semi-circular spring secured to the lower end of said spindle, an auxiliary frame secured at its opposite ends to the respective ends of said curved spring, a motor mounted on said auxiliary frame and having its engine shaft journaled therein, a wheel carried by said auxiliary frame and having its axle journaled thereon, and a driving connection between the shaft of said motor and the axle of said wheel.

11. In a vehicle, a main frame, an auxiliary frame member pivotally mounted at the forward end of said frame, a steering wheel journaled in said auxiliary frame and at the side thereof, a motor mounted on said auxiliary frame, the journal of said wheel being located above the center of gravity of the frame member and motor, and a driving connection between said motor and wheel.

12. In a vehicle, a main frame, an auxiliary frame mounted at its ends to the main frame, a wheel journaled on said auxiliary frame at the side thereof, a motor mounted upon said auxiliary frame and intersecting the plane of rotation of the wheel, and a driving connection between said motor and wheel.

13. In a vehicle, the combination, with a main frame, a substantially semicircular spring secured thereto, an auxiliary frame secured at its opposite ends to the respective ends of said curved spring, a motor mounted on said auxiliary frame, a wheel carried by said auxiliary frame, and a driving connection between said motor and wheel.

14. In a vehicle, the combination, with a frame, a curved leaf spring connected to said frame, an auxiliary frame member arranged at one side of said leaf spring, pins extending transversely of said frame member and connecting the respective ends thereof with adjacent ends of the spring, a tie bar connecting the pins, a wheel journaled on said frame member, a motor mounted on said frame member, and a driving connection between said motor and said wheel.

15. In a vehicle, the combination, with a frame having a steering head at its forward end, a curved leaf spring connected with said steering head, an auxiliary frame member arranged at one side of said leaf spring, pins extending transversely of said frame member and connecting the respective ends thereof with the adjacent ends of said spring, a tie bar to connect those ends of said pins on that side of the spring opposite the frame bar, a wheel journaled on said frame member between said tie bar and said frame member, a motor mounted on said frame member, and a driving connection between said motor and said wheel.

In testimony whereof, I affix my signature in presence of two witnesses.

G. HARRIES GORMAN.

Witnesses:
H. L. MILLER,
W. A. HEINSCH.

Copies of this patent may be obtained for five cents each, by addressing the "Commissioner of Patents, Washington, D. C."